(12) United States Patent
Kim et al.

(10) Patent No.: US 11,566,119 B2
(45) Date of Patent: Jan. 31, 2023

(54) SHEATH COMPOSITION HAVING FLAME RETARDANCY AND WATER RESISTANCE, AND CABLE HAVING SHEATH LAYER FORMED THEREFROM

(71) Applicant: LS CABLE & SYSTEM LTD., Anyang-si (KR)

(72) Inventors: In Ha Kim, Seoul (KR); Jae Ik Lee, Seoul (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 303 days.

(21) Appl. No.: 16/636,835

(22) PCT Filed: Mar. 28, 2018

(86) PCT No.: PCT/KR2018/003674
§ 371 (c)(1),
(2) Date: Feb. 5, 2020

(87) PCT Pub. No.: WO2019/035526
PCT Pub. Date: Feb. 21, 2019

(65) Prior Publication Data
US 2020/0369857 A1   Nov. 26, 2020

(30) Foreign Application Priority Data

Aug. 18, 2017  (KR) .................. 10-2017-0105001
Nov. 16, 2017  (KR) .................. 10-2017-0153109

(51) Int. Cl.
| | |
|---|---|
| *C08K 13/06* | (2006.01) |
| *C08F 14/06* | (2006.01) |
| *C08K 3/08* | (2006.01) |
| *C08K 3/22* | (2006.01) |
| *C08K 3/26* | (2006.01) |
| *C08K 5/092* | (2006.01) |
| *C08K 5/12* | (2006.01) |
| *C08K 9/06* | (2006.01) |
| *C09K 21/02* | (2006.01) |
| *H01B 3/44* | (2006.01) |
| *H01B 7/02* | (2006.01) |
| *H01B 7/282* | (2006.01) |
| *H01B 7/295* | (2006.01) |
| *H01B 13/22* | (2006.01) |

(52) U.S. Cl.
CPC .............. *C08K 13/06* (2013.01); *C08F 14/06* (2013.01); *C08K 3/08* (2013.01); *C08K 3/22* (2013.01); *C08K 3/26* (2013.01); *C08K 5/092* (2013.01); *C08K 5/12* (2013.01); *C08K 9/06* (2013.01); *C09K 21/02* (2013.01); *H01B 3/443* (2013.01); *H01B 7/0216* (2013.01); *H01B 7/282* (2013.01); *H01B 7/295* (2013.01); *H01B 13/22* (2013.01); *C08K 2003/0893* (2013.01); *C08K 2003/2224* (2013.01); *C08K 2003/265* (2013.01); *C08K 2201/014* (2013.01)

(58) Field of Classification Search
None
See application file for complete search history.

(56) References Cited

U.S. PATENT DOCUMENTS 5,057,367 A * 10/1991 Morii ...................... C08K 3/22
524/427

FOREIGN PATENT DOCUMENTS

| CN | 101633765 A | 1/2010 |
|---|---|---|
| CN | 101870790 | * 10/2010 |
| CN | 103871579 A | 6/2014 |
| CN | 108264703 | * 7/2015 |
| JP | 2000336215 A | 12/2000 |
| JP | 2013203855 A | 10/2013 |
| JP | 2016044294 A | 4/2016 |
| KR | 1019980063167 | 10/1998 |
| KR | 1020170012858 A | 2/2017 |

OTHER PUBLICATIONS

Machine translation of Li et al. CN108264703 (Year: 2018).*
Datasheet for dioctyl terephthalate (Year: 2010).*
Datasheet for trioctyl trimellitate.*
Machine translation of Xie et al. (CN 101870790).*
Chinese Office Action for related Chinese Application No. 201880052329.9; action dated Jul. 13, 2020; (7 pages).
International Search Report for related International Application No. PCT/KR2018/003674; report dated Feb. 21, 2019; (3 pages).
Written Opinion for related International Application No. PCT/KR2018/003674; report dated Feb. 21, 2019; (6 pages).

* cited by examiner

*Primary Examiner* — Robert T Butcher
(74) *Attorney, Agent, or Firm* — K&L Gates LLP

(57) ABSTRACT

Provided is a cable having a sheath composition having flame retardancy and water resistance, and a sheath layer formed of the sheath composition. Specifically, the present invention relates to a sheath composition for simultaneously improving flame retardancy and water resistance of a sheath layer of a cable, which are in a trade-off relation with each other, and physical properties such as heat resistance, hardness, and wear resistance, improving appearance, and reducing manufacturing costs; and a cable having a sheath layer formed of the sheath composition.

11 Claims, 1 Drawing Sheet

(a)   (b)

SHEATH COMPOSITION HAVING FLAME RETARDANCY AND WATER RESISTANCE, AND CABLE HAVING SHEATH LAYER FORMED THEREFROM

CROSS-REFERENCE TO RELATED APPLICATIONS

The present application is a National Stage of International Application No. PCT/KR2018/003674, filed Mar. 28, 2018 which claims priority to Korean Application No. 10-2017-0105001, filed Aug. 18, 2017 and Korean Application No. 10-2017-0153109, filed Nov. 16, 2017, the disclosure of which are incorporated herein by reference.

FIELD OF THE INVENTION

The present invention relates to a cable having a sheath composition having flame retardancy and water resistance, and a sheath layer formed of the sheath composition. Specifically, the present invention relates to a sheath composition for simultaneously improving flame retardancy and water resistance of a sheath layer of a cable, which are in a trade-off relation with each other, and physical properties such as heat resistance, hardness, and wear resistance, improving appearance, and reducing manufacturing costs; and a cable having a sheath layer formed of the sheath composition.

BACKGROUND OF THE INVENTION

FIG. 1 is a schematic cross-sectional view of a cable used for wiring of a general electrical structure or an electric device, indoor wiring, or the like. A low-voltage cable used for the purpose of indoor wiring as illustrated in FIG. 1(a) may include a conductor 100', an insulating layer 200' surrounding the conductor 100', and a sheath layer 300' surrounding the insulating layer 200' to protect the insulating layer 200'. A medium-voltage cable as illustrated in FIG. 1(b) may further include a metal shielding layer 400' between the insulating layer 200' and the sheath layer 300' to block electromagnetic waves caused by current flowing through the conductor 100'.

Insulation performance of the cable, when used in an environment exposed to moisture, e.g., an underwater environment, may decrease due to penetration of moisture into the insulating layer 200' or leakage current, dielectric breakdown, etc. may occur in the cable when a water tree, i.e., moisture penetrating the insulating layer 200', dissociates into ions, the ions vibrate due to an alternating electric field applied thereto, thus causing cracks in the insulating layer 200', and moisture penetrates the conductor 100' through the cracks.

In addition, as the sheath layer 300' of the cable absorbs moisture, damage may be caused due to corrosion of the metal shielding layer 400' due to permeation of the moisture, and an electric shock accident may occur due to contact with a human body or a disconnection accident or the like may occur when an induced voltage increases at an open end of the metal shielding layer 400' which is one-sided grounded.

Accordingly, research and development are being conducted to improve water resistance of the sheath layer 300' of the cable to protect the cable from insulation performance degradation of the insulating layer 200', leakage current, dielectric breakdown, corrosion of the metal shielding layer 400', and the like due to permeation of moisture.

When a large amount of a plasticizer is added to the sheath composition for forming the sheath layer 300' to secure flexibility and workability of the cable, processability of the sheath layer 300', and the like, the plasticizer is likely to be extracted or hydrolyzed due to permeation of water, thereby decreasing electrical characteristics of the cable. When a plasticizer having insufficient heat resistance is applied, streaks may occur on the sheath layer 300' due to friction between portions of the cable wound around a bobbin when tension is additionally applied to the cable during finishing of the winding of the cable in a state in the sheath layer 300 is semi-dried after extrusion, thereby deteriorating the appearance of the cable.

Alternatively, the sheath layer 300' may be formed of a sheath composition containing a large amount of a flame retardant to ensure flame retardancy. However, water resistance of the sheath layer 300' may decrease when the flame retardant is a hydrophilic metal hydroxide, e.g., aluminum hydroxide or magnesium hydroxide, whereas flame retardancy of the sheath layer 300' may decrease when the amount of the flame retardant is reduced to suppress a decrease in water resistance.

Furthermore, an inorganic filler such as calcium carbonate ($CaCO_3$) may be added to the sheath composition for forming the sheath layer 300' to reduce manufacturing costs of the cable. However, when a large amount of the inorganic filler is added, water resistance and mechanical properties of the sheath layer 300' may decrease and thus there is a limit to reducing manufacturing costs while maintaining the performance of the cable.

Accordingly, there is an urgent need for a sheath composition for simultaneously improving flame retardancy and water resistance, which are in a trade-off relation with each other, and physical properties, such as heat resistance, hardness, and wear resistance, of a sheath layer of a cable, improving appearance, and reducing manufacturing costs; and a cable having a sheath layer formed of the sheath composition.

BRIEF SUMMARY OF THE INVENTION

The present invention is directed to providing a sheath composition for improving both flame retardancy and water resistance, which are in a trade-off relation with each other, of a sheath layer of a cable, and a cable having a sheath layer formed of the sheath composition.

The present invention is also directed to providing a sheath composition for simultaneously improving physical properties, such as heat resistance, hardness, and wear resistance, of a sheath layer of a cable without reducing flame retardancy and water resistance, and a cable having a sheath layer formed of the sheath composition.

The present invention is also directed to providing a sheath composition for improving appearance of a sheath layer of a cable and reducing manufacturing costs, and a cable having a sheath layer formed of the sheath composition.

According to an aspect of the present invention, provided is a sheath composition comprising: polyvinyl chloride resin as a base resin; a plasticizers; and an inorganic additive, wherein the plasticizer comprises a low-freezing-point plasticizer having a freezing point Tm of −40° C. or less; and a high-freezing-point plasticizer having a freezing point Tm higher than the freezing point Tm of the low-freezing-point plasticizer, the difference in the freezing point Tm between the low-freezing-point plasticizer and the high-freezing-point plasticizer is greater than or equal to 5° C., the inorganic additive comprises a flame retardant, and an amount of the inorganic additive is 45 to 70 parts by weight, based on 100 parts by weight of the base resin.

According to another aspect of the present invention, provided is the sheath composition, wherein the freezing point Tm of the low-freezing-point plasticizer is in a range of −60 to −40° C., and the freezing point Tm of the high-freezing-point plasticizer is greater than −40° C. and equal to or less than −20° C.

According to other aspect of the present invention, provided is the sheath composition, wherein a weight ratio between the high-freezing-point plasticizer and the low-freezing-point plasticizer is from 1:0.5 to 1:2.

According to other aspect of the present invention, provided is the sheath composition, wherein a weight-average molecular weight Mw of the low-freezing-point plasticizer is equal to or less than 500, and a weight-average molecular weight Mw of the high-freezing-point plasticizer is great than 500.

According to other aspect of the present invention, provided is the sheath composition, wherein the low-freezing-point plasticizer comprises 1,4-benzenedicarboxylic acid and di-C8-C10 branched alkyl ester, and the high-freezing-point plasticizer comprises trioctyl trimellitate (TOTM).

According to other aspect of the present invention, provided is the sheath composition, wherein an amount of the plasticizer is 35 to 60 parts by weight, based on 100 parts by weight of the base resin.

According to other aspect of the present invention, provided is the sheath composition, wherein an amount of the flame retardant is 10 to 45 parts by weight, based on 100 parts by weight of the base resin, and the flame retardant comprises a metal hydroxide flame retardant, wherein the metal hydroxide flame retardant comprises a hydrophobic surface-treated metal hydroxide and a metal hydroxide surface-treated with a lubricant, and a weight ratio between the metal hydroxide surface-treated with the lubricant and the hydrophobic surface-treated metal hydroxide is from 1:0.5 to 1:3.

According to other aspect of the present invention, provided is the sheath composition, wherein the inorganic additive comprises a flame retardant aid, wherein the flame retardant aid comprises an antimony-based flame retardant, and an amount of the flame retardant aid is 3.5 to 8 parts by weight, based on 100 parts by weight of the base resin.

According to other aspect of the present invention, provided is the sheath composition, wherein the inorganic additive comprises an inorganic filler, wherein the inorganic filler comprises calcium carbonate ($CaCo_3$), and an amount of the inorganic filler is 10 to 40 parts by weight, based on 100 parts by weight of the base resin.

According to other aspect of the present invention, provided is the sheath composition, wherein the inorganic additive comprises a heat stabilizer, wherein the heat stabilizer comprises a Ca—Mg—Zn-based heat stabilizer, and an amount of the heat stabilizer is 2 to 6 parts by weight, based on 100 parts by weight of the base resin.

According to an aspect of the present invention, provided is a cable, comprising: a conductor; an insulation layer surrounding the conductor; and a sheath layer surrounding the insulating layer, the sheath layer being formed of the sheath composition.

According to another aspect of the present invention, provided is the cable, wherein a rate of increase in weight of a sample of the sheath layer, which is measured after the sample is immersed in 70° C. water for 96 hours, is 1.0 $mg/cm^2$ or less.

According to another aspect of the present invention, provided is the cable, wherein a rate of reduction in weight of a sample of the sheath layer, which is measured after the sample is heated in a 100° C. oven for 168 hours, is 1.5 $mg/cm^2$ or less.

A sheath composition according to the present invention has an excellent effect of improving both flame retardancy and water resistance, which are in a trade-off relation with each other, of a sheath layer of a cable by limiting a combination of a specific plasticizer and inorganic additives such as a specific flame retardant, a flame retardant aid, and other inorganic fillers, and the amounts thereof.

Furthermore, the sheath composition according to the present invention has an excellent effect of simultaneously improving physical properties, such as heat resistance, hardness, and wear resistance, of the sheath layer of the cable without reducing flame retardancy and water resistance, improving appearance of the cable, and reducing manufacturing costs by limiting the total amount of inorganic additives to be added.

DETAILED DESCRIPTION OF THE INVENTION

Figure 1:
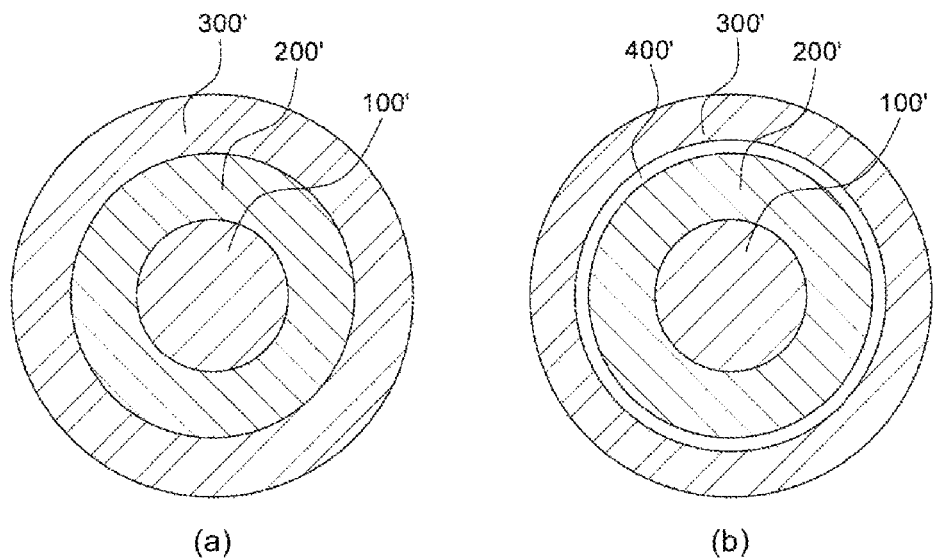
FIG. 1 is a schematic cross-sectional view of a power cable of the related art.

Hereinafter, exemplary embodiments of the present invention will be described in detail with reference to the accompanying drawings. The present invention is, however, not limited to the embodiments set forth herein and may be embodied in many different forms. Rather, the embodiments set forth herein are provided so that this disclosure may be thorough and complete and fully convey the scope of the invention to those of ordinary skill in the art. Throughout the specification, the same reference numbers represent the same elements.

The present invention relates to a sheath composition for forming a sheath layer of a cable.

The sheath composition may include polyvinyl chloride (PVC) resin as a base resin, a plasticizer, and inorganic additives such as a flame retardant, a flame retardant aid, and an inorganic filler.

The polyvinyl chloride (PVC) resin as a base resin has its own flame retardancy but the flame retardancy may not be sufficient according to the type of a cable to be applied, and the prices of essential additives such as a plasticizer and a heat stabilizer are higher than that of PVC resin. Thus inorganic additives such as a flame retardant and a filler described below may be added.

The plasticizer may improve flexibility and workability of a cable, extrudability and processability of the sheath layer, and the like but an ion exchange reaction may occur due to ions melted in the plasticizer and thus conductive impurities may be generated, thereby lowering electrical properties of the sheath layer.

Here, the plasticizer may include, for example, a phthalate-based plasticizer, a phosphate-based plasticizer, a trimellitate-based plasticizer, an epoxy-based plasticizer, an ester-based plasticizer, a citrate-based plasticizer, a polymeric plasticizer, or a combination thereof, and preferably, a mixture of a low-freezing-point plasticizer having a freezing point Tm of −40° C. or less, e.g., −60 to −40° C., and a high-freezing-point plasticizer having a freezing point Tm greater than −40° C., e.g., greater than −40° C. and equal to or less than −20° C. The difference in a freezing point between the low-freezing-point plasticizer and the high-freezing-point plasticizer is 5° C. or higher, for example, 5 to 20° C., and preferably 10° C. or higher.

In addition, weight-average molecular weight Mw of the low-freezing-point plasticizer may be 500 or less, for example, 300 to 480, and weight-average molecular weight Mw of the high-freezing-point plasticizer may be greater than 500, for example, greater than 500 and equal to or less than 650.

The low-freezing-point plasticizer may be, for example, 1,4-benzenedicarboxylic acid, di-C8-C10 branched alkyl ester (trivial name: 1,4-benzenedicarboxylic acid, mixed C8-C10 branched and 2-ethylhexyl diesters) may be applied. The high-freezing-point plasticizer may be, for example, trioctyl trimellitate (TOTM). A weight ratio between the high-freezing-point plasticizer and the low-freezing-point plasticizer is from 1:0.5 to 1:2, and preferably, 2:3.

The low-freezing-point plasticizer may maximize flexibility and workability of the cable, extrudability and processability of the sheath layer, and the like. The high-freezing-point plasticizer may additionally improve heat resistance of the sheath composition. In particular, when the heat resistance of the sheath composition is further improved using the high-freezing-point plasticizer, streaks may be suppressed from being formed on the sheath layer due to friction between portions of the sheath layer of the cable wound around a bobbin when tension is additionally applied to the cable during finishing of the winding of the cable around the bobbin in a state in which the sheath layer is semi-dried after extrusion.

Therefore, flexibility and workability of the cable, extrudability and processability of the sheath layer, and the like may be insufficient when the weight ratio between the high-freezing-point plasticizer and the low-freezing-point plasticizer is less than 1:0.5, whereas heat resistance of the sheath composition may be insufficient and thus streaks may occur on a surface of the sheath layer during winding of the cable when the weight ratio is greater than 1:2.

The amount of the plasticizer may be 35 to 60 parts by weight, and preferably, 45 to 60 parts by weight, based on 100 parts by weight of the base resin. When the amount of the plasticizer is less than 35 parts by weight, the flexibility of the cable may decrease, whereas when the amount of the plasticizer is more than 60 parts by weight, the plasticizer is likely to volatile or leach and physical properties, e.g., hardness, oil resistance, flame retardancy and tensile strength, may decrease.

The flame retardant may include an inorganic flame retardant, which is a metal hydroxide such as magnesium hydroxide, aluminum hydroxide, a mixture of huntite and hydromagnesite, hydromagnesite, magnesium carbonate hydroxide, and hydrotalcite; an organic flame retardants such as an organophosphorus compound, a halogen-based compound, or a melamine-based compound; and preferably, magnesium hydroxide. The organic flame retardant is highly compatible with the base resin but the metal hydroxide has a hydroxyl group (—OH) on a surface thereof and thus has a property of easily absorbing moisture, thereby reducing water resistance of the sheath layer.

Accordingly, the metal hydroxide flame retardant may be hydrophobically surface-treated with silane or the like to improve the water resistance of the sheath layer. In particular, the metal hydroxide flame retardant may be a mixture of a metal hydroxide surface-treated hydrophobically with silane or the like and a metal hydroxide surface-treated with a lubricant or the like. A weight ratio between the metal hydroxide surface-treated with the lubricant and the metal hydroxide surface-treated with silane may be from 1:0.5 to 1:3, and preferably, from 1:1 to 1:2, thereby achieving desired degrees of flame retardancy and water resistance of the sheath composition and reducing manufacturing costs.

Here, the water resistance of the sheath composition may greatly decrease when the weight ratio between the metal hydroxide surface-treated with the lubricant and the metal hydroxide surface-treated with the silane is less than 1:0.5, whereas manufacturing costs of the sheath composition increases unnecessarily when the water resistance is greater than 1:3. The amount of the flame retardant may be 10 to 45 parts by weight, and preferably, 30 to 40 parts by weight, based on 100 parts by weight of the base resin. Flame retardancy of the sheath layer may be insufficient when the amount of the flame retardant is less than 10 parts by weight, whereas load may increase during extrusion of the sheath composition to form the sheath layer, water resistance, hardness, wear resistance, etc. of the formed sheath layer may decrease, and appearance may deteriorate when the amount of the flame retardant is greater than 45 parts by weight.

Meanwhile, the sheath composition may further include a flame retardant aid as well as the flame retardant. The flame retardant aid may include, for example, an antimony-based flame retardant aid. The amount of the flame retardant aid may be 3.5 to 8 parts by weight, preferably, 4.5 to 6 parts by weight, based on 100 parts by weight of the base resin. Herein, flame retardancy of the sheath composition may be insufficient when the amount of the flame retardant aid is less than 3.5 parts by weight, whereas water resistance, hardness, wear resistance, etc. of the sheath layer formed of the sheath composition may decrease, appearance may deteriorate, and manufacturing costs of the sheath composition may increase unnecessarily when the amount of the flame retardant aid is greater than 8 parts by weight.

The inorganic filler may include an inorganic material such as calcium carbonate ($CaCO_3$), and manufacturing costs of the sheath composition may be reduced by adding the inorganic filler. However, the inorganic filler such as calcium carbonate also has a hydrophilic surface and thus may be surface-treated with silane, a lubricant, or the like because water resistance of the sheath layer formed of the sheath composition may decrease.

The amount of the inorganic filler may be 10 to 40 parts by weight, and preferably, 15 to 25 parts by weight, based on 100 parts by weight of the base resin. An effect of reducing manufacturing costs of the sheath composition may be small when the amount of the inorganic filler is less than 10 parts by weight, whereas water resistance, hardness, wear resistance, etc. of the sheath layer formed of the sheath composition may decrease and appearance may deteriorate when the amount of the inorganic filler is greater than 40 parts by weight.

The sheath composition may further include a heat stabilizer to additionally improve heat resistance of the sheath layer formed of the sheath composition and to suppress dissociation due to deterioration of components of the sheath composition. The heat stabilizer may include at least one selected from the group consisting of a lead-based stabilizer, a lead-free stabilizer, an epoxy stearate, a metal soap stabilizer, etc., and preferably, a Ca—Mg—Zn-based heat stabilizer.

Here, the amount of the heat stabilizer may be 2 to 6 parts by weight, and preferably, 4 to 5 parts by weight, based on 100 parts by weight of the base resin. When the amount of the heat stabilizer is less than 2 parts by weight, the heat resistance of the sheath composition may decrease or the sheath composition may decompose due to deterioration of the components thereof, whereas when the amount of the heat stabilizer is greater than parts by weight, the water resistance, hardness, wear resistance, etc. of the sheath layer formed of the sheath composition may decrease and appearance may deteriorate.

Therefore, both flame retardancy and water resistance that are in a trade-off relation with each other may be improved, hardness, wear resistance, and the like of a sheath layer formed of the sheath composition may be improved, and appearance defects may be suppressed by adjusting the total amount of inorganic additives, such as a flame retardant, a flame retardant aid, an inorganic filler, and a heat stabilizer, which are contained in the sheath composition according to the present invention.

Figure 2:
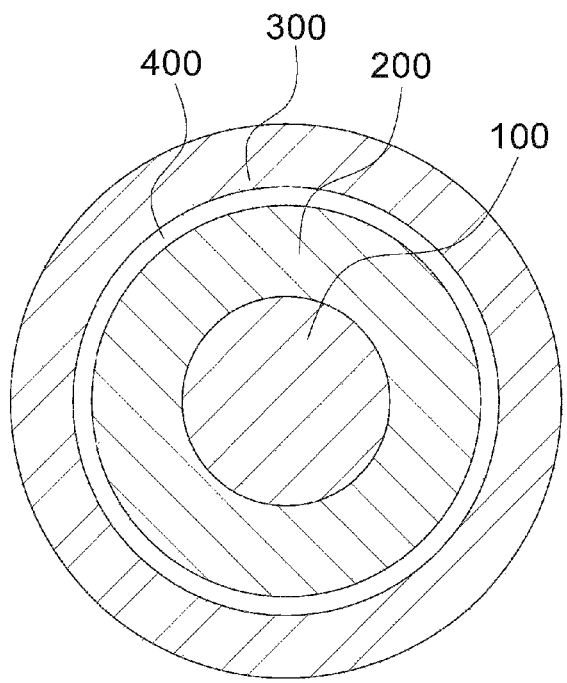
FIG. 2 is a schematic cross-sectional view of a power cable with a sheath layer formed of a sheath composition according to the present invention.

Specifically, the total amount of the inorganic additives may be 45 to 70 parts by weight, and preferably, 50 to 60 parts by weight, based on 100 parts by weight of the base resin. When the amount of the inorganic additives is less than 45 parts by weight, the flame retardancy, heat resistance, etc. of the sheath composition may be insufficient, whereas when the amount of the inorganic additives is greater than 70 parts by weight, the water resistance of the sheath composition may decrease, the hardness of the sheath layer formed of the sheath composition may decrease, wear resistance (scratch resistance) may decrease due to poor surface roughness, and appearance defects may occur. FIG. 2 is a schematic cross-sectional view of a power cable with a sheath layer formed of a sheath composition according to the present invention.

The cable of FIG. 2 may include a conductor 100, an insulation layer 200 surrounding the conductor 100, and a sheath layer 300 surrounding the insulating layer 200 to protect the insulation layer 200. In addition, the power cable, when it is a medium-voltage cable, may further include a metal shielding layer 400 between the insulating layer 200 and the sheath layer 300 to block electromagnetic waves from the conductor 100. The metal shielding layer 400 may be formed by cross-winding a metal tape or the like.

The conductor 100 may be formed of a conductive material through which current flows, e.g., a metal such as copper or aluminum, and may be a single wire or a stranded wire obtained by twisting a plurality of strands. The insulating layer 200 is configured to electrically insulate the cable and may be formed of, for example, a polymer resin. A diameter of the conductor 100 may be appropriately selected according to the capacity of the cable including the same, and a thickness of the insulating layer 200 may be appropriately selected according to a voltage of the cable including the same. The sheath layer 300 may be formed of the above-described sheath composition according to the present invention.

EXAMPLES

1. Preparation Example

After preparing a sheath composition containing components in amounts as shown in Table 1 below, sheath layer samples and cable samples having a sheath layer were manufactured using the sheath composition.

TABLE 1

| | Example | | | Comparative example | | | | | |
|---|---|---|---|---|---|---|---|---|---|
| | 1 | 2 | 3 | 1 | 2 | 3 | 4 | 5 | 6 |
| resin | 100 | | | | | | | | |
| flame retardant 1 | 20 | 15 | 15 | 5 | 20 | 20 | 40 | 20 | 20 |
| flame retardant 2 | 10 | 15 | 15 | 25 | 10 | 10 | 10 | 10 | 10 |
| flame retardant aid | 5 | 5 | 5 | 5 | 2 | 5 | 5 | 5 | 5 |
| heat stabilizer | 4 | 4 | 4 | 4 | 4 | 4 | 4 | 4 | 1 |
| plasticizer 1 | 20 | 20 | 25 | 20 | 20 | 10 | 20 | 20 | 20 |
| plasticizer 2 | 25 | 25 | 20 | 25 | 25 | 35 | 25 | 25 | 25 |
| filler | 15 | 15 | 15 | 15 | 15 | 15 | 15 | 45 | 15 | resin: polyvinyl chloride resin
flame retardant 1: silane-coated magnesium hydroxide
flame retardant 2: lubricant-coated magnesium hydroxide
flame retardant aid: antimony-based flame retardant aid
heat stabilizer: Ca—Mg—Zn-based heat stabilizer
plasticizer 1: trioctyl trimellitate (TOTM; freezing point: −35° C.)
plasticizer 2: 1,4-benzene dicarboxylic acid, di-C8-C10 branched alkyl ester (freezing point: −45° C.)
filler: calcium carbonate 2. Evaluation of Physical Properties 1) Evaluation of Water Resistance Each of the sheath layer samples according to examples and comparative examples was immersed in 70° C. water for 96 hours, and thereafter, a rate of increase in the weight thereof due to moisture infiltration was measured. The weight increase rate should be 1.0 mg/cm$^2$ or less. The weight increase rate is calculated by an equation below.

$$\text{weight increase rate (mg/cm}^2\text{)}=(\text{weight of sample after immersion}-\text{weight of sample before immersion})/\text{surface area of sample}$$

2) Evaluation of Flame Retardancy

Each of the cable samples according to examples and comparative examples was combusted for 20 minutes in accordance with IEC 60332-3-24 (Category C) and a combustion length was measured. The combustion length should be 2.5 m or less.

3) Evaluation of Heating Loss

Each of the sheath layer samples according to the examples and the comparative examples was heated in a 100° C. oven for 168 hours and thereafter a rate of reduction in the weight thereof was measured. The weight reduction rate should be 1.5 mg/cm$^2$ or less. The weight reduction rate is calculated by an equation below.

$$\text{weight reduction rate (mg/cm}^2\text{)}=(\text{weight of sample before heating}-\text{weight of sample after heating})/\text{surface area of sample}$$

4) Evaluation of Heat Aging

Each of the sheath layer samples according to the examples and the comparative examples was heat-aged in a 100° C. oven for 168 hours (one week) according to IEC 60502-1/ST2, and thereafter, tensile strength and elongation thereof were measured. Rates of change in the tensile strength and the elongation were calculated, based on tensile strength and elongation measured at room temperature before heat aging. Here, the rates of change in tensile strength and elongation after heat aging should not respectively exceed ±25% of the tensile strength and ±25% of elongation which were measured at room temperature before heating aging.

5) Evaluation of Hardness

Shore A hardness of each of the sheath layer samples according to the examples and the comparative examples was measured.

6) Evaluation of Glossiness

Sheath layer samples were manufactured in the form of ribbon using the sheath compositions according to the examples and the comparative examples and using a 30-mm small extruder and then a glossiness level of each of the samples was measured five times by a glossmeter GM-26 (manufactured by LANDTEK) and an average value thereof was calculated.

A result of the evaluation of the physical properties is shown in Table 2 below.

TABLE 2

|  |  | Unit | Example | | | Comparative example | | | | | |
|---|---|---|---|---|---|---|---|---|---|---|---|
|  |  |  | 1 | 2 | 3 | 1 | 2 | 3 | 4 | 5 | 6 |
| water resistance |  | mg/cm² | 0.76 | 0.84 | 0.86 | 1.24 | 0.89 | 0.91 | 0.75 | 0.79 | 0.74 |
| flame retardancy |  | m | 1.7 | 1.6 | 1.4 | 1.5 | burned down | 1.6 | 1.8 | 1.9 | 1.6 |
| heating loss |  | mg/cm² | 1.35 | 1.29 | 1.14 | 1.35 | 1.33 | 1.77 | 1.40 | 1.41 | 1.44 |
| heat aging (100° C./168 hours) | tensile strength change rate | % | 91 | 92 | 90 | 87 | 88 | 91 | 87 | 88 | 68 |
|  | elongation change rate | % | 89 | 88 | 92 | 86 | 86 | 92 | 84 | 88 | 45 |
| hardness |  | — | 93 | 93 | 93 | 93 | 92 | 92 | 88 | 87 | 93 |
| glossiness |  | — | 75 | 76 | 75 | 74 | 73 | 73 | 61 | 62 | 74 |

As shown in Table 2 above, all physical properties, such as water resistance, flame retardancy, heat resistance, water resistance (scratch resistance) according to hardness, appearance according to glossiness, etc. of the sheath layers formed of the sheath compositions according to the examples of the present invention were good. In contrast, in the sheath composition of comparative example 1, the total amount of the flame retardant was the same as those in the examples but the amount of the flame retardant 1 which is a silane-coated flame retardant was below a standard, compared to that of the flame retardant 2 which is a lubricant-coated flame retardant, and water resistance was very low. In the sheath composition of comparative example 2, the amount of the flame retardant aid was below a standard and thus flame retardancy decreased greatly. In the sheath composition of comparative example 3, the total amount of the plasticizer was the same as those in the examples but the amount of a high-freezing-point plasticizer was below a standard, compared to a low-freezing-point plasticizer, and thus, a heating loss rate greatly increased due to insufficient heat resistance. In the sheath compositions of comparative examples 4 and 5, the total amount of inorganic additives was excessively large due to an excessively large amount of the flame retardant or the filler and thus the hardness, glossiness, etc. of the sheath layer decreased greatly. In the sheath composition of comparative example 6, because the amount of the heat stabilizer was below a standard, heat resistance was insufficient and thus rates of change in tensile strength and elongation decreased greatly after heat aging.

While the present invention has been described above with respect to exemplary embodiments thereof, it would be understood by those of ordinary skilled in the art that various changes and modifications may be made without departing from the technical conception and scope of the present invention defined in the following claims. Thus, it is clear that all modifications are included in the technical scope of the present invention as long as they include the components as claimed in the claims of the present invention.

The invention claimed is:

1. A sheath composition comprising:
   polyvinyl chloride resin as a base resin;
   a plasticizer; and
   an inorganic additive,
   wherein the plasticizer comprises a low-freezing-point plasticizer having a freezing point Tm of −40° C. or less and a high-freezing-point plasticizer having a freezing point Tm higher than the freezing point Tm of the low-freezing-point plasticizer,
   the difference in the freezing point Tm between the low-freezing-point plasticizer and the high-freezing-point plasticizer is greater than or equal to 5° C.,
   the inorganic additive comprises a flame retardant,
   an amount of the inorganic additive is 45 to 70 parts by weight, based on 100 parts by weight of the base resin,
   a weight ratio between the high-freezing-point plasticizer and the low-freezing-point plasticizer is from 1:0.5 to 1:2,
   an amount of the flame retardant is 30 to 40 parts by weight, based on 100 parts by weight of the base resin, and the flame retardant comprises a metal hydroxide flame retardant, and
   the metal hydroxide flame retardant comprises a hydrophobic surface-treated metal hydroxide and a metal hydroxide surface-treated with a lubricant, and a weight ratio between the metal hydroxide surface-treated with the lubricant and the hydrophobic surface-treated metal hydroxide is from 1:1 to 1:2.

2. The sheath composition of claim 1, wherein the freezing point Tm of the low-freezing-point plasticizer is in a range of −60 to −40° C., and
   the freezing point Tm of the high-freezing-point plasticizer is greater than −40° C. and equal to or less than −20° C.

3. The sheath composition of claim 2, wherein a weight-average molecular weight Mw of the low-freezing-point plasticizer is equal to or less than 500, and
   a weight-average molecular weight Mw of the high-freezing-point plasticizer is great than 500.

4. The sheath composition of claim 3, wherein the low-freezing-point plasticizer comprises 1,4-benzenedicarboxylic acid and di-C8-C10 branched alkyl ester, and
   the high-freezing-point plasticizer comprises trioctyl trimellitate (TOTM).

5. The sheath composition of claim 1, wherein an amount of the plasticizer is 35 to 60 parts by weight, based on 100 parts by weight of the base resin.

6. The sheath composition of claim 1, wherein the inorganic additive comprises a flame retardant aid,
wherein the flame retardant aid comprises an antimony-based flame retardant, and
an amount of the flame retardant aid is 3.5 to 8 parts by weight, based on 100 parts by weight of the base resin.

7. The sheath composition of claim 1, wherein the inorganic additive comprises an inorganic filler,
wherein the inorganic filler comprises calcium carbonate ($CaCo_3$), and
an amount of the inorganic filler is 10 to 40 parts by weight, based on 100 parts by weight of the base resin.

8. The sheath composition of claim 1, wherein the inorganic additive comprises a heat stabilizer,
wherein the heat stabilizer comprises a Ca—Mg—Zn-based heat stabilizer, and
an amount of the heat stabilizer is 2 to 6 parts by weight, based on 100 parts by weight of the base resin.

9. A cable comprising:
a conductor;
an insulation layer surrounding the conductor; and
a sheath layer surrounding the insulating layer, the sheath layer being formed of the sheath composition of claim 1.

10. The cable of claim 9, wherein a rate of increase in weight of a sample of the sheath layer, which is measured after the sample is immerged in 70° C. water for 96 hours, is 1.0 mg/cm$^2$ or less.

11. The cable of claim 9, wherein a rate of reduction in weight of a sample of the sheath layer, which is measured after the sample is heated in a 100° C. oven for 168 hours, is 1.5 mg/cm$^2$ or less.

* * * * *